Feb. 11, 1958  H. BERNHARDT  2,822,728
MICROSCOPE LENSES FOR LOWER-POWER MAGNIFICATION
Filed June 21, 1956
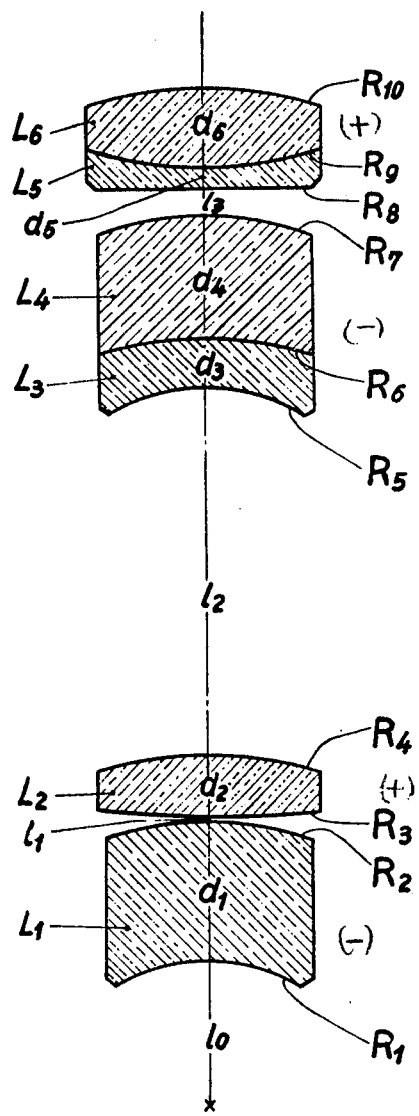
Inventor:
Heinz Bernhardt

United States Patent Office 2,822,728
Patented Feb. 11, 1958

2,822,728

MICROSCOPE LENSES FOR LOWER-POWER MAGNIFICATION

Heinz Bernhardt, Jena, Germany, assignor to VEB Carl Zeiss Jena, Jena, Germany

Application June 21, 1956, Serial No. 592,692

3 Claims. (Cl. 88—57)

The invention relates to a microscope lens, of which the front element adjacent to the object is a meniscus having its concave surface facing the object, and which in addition to collecting elements contains a second meniscus, the centre thickness of each of said two menisci being greater than half the radius of curvature of the dispersing outer surface.

A known lens of this kind is intended for medium and high-power magnification. For lower-power magnification a lens is known in which the second meniscus is eliminated but the object distance is considerably smaller than in the first-mentioned lens.

The invention provides a lens for lower-power magnification in which elimination of the second meniscus is dispensed with but which has a considerably greater object distance.

This lens is distinguished in that said second meniscus, which may consist of a single glass or of glasses cemented together, lies inside the optical system, in that its concave surface faces the object and in that the ratio of its focal length to that of the lens lies between the values 2 and 4.

For the purpose of satisfactorily correcting the apertural and colour error, such a lens advantageously contains two collecting elements, one of which is disposed behind the front meniscus and one behind the second meniscus, the latter element at least consisting of glasses which are cemented together.

A lens of this latter kind is illustrated diagrammatically in the figure of the drawing. It comprises a meniscus $L_1$, a collecting lens $L_2$, a meniscus consisting of two glasses $L_3$ and $L_4$ cemented together, and a collecting element consisting of two glasses $L_5$ and $L_6$ which are cemented together. The total focal length of the lens is 23 millimetres, that of the meniscus $L_1$ is $-192$ millimetres, that of the collecting lens $L_2$ is $+20$ millimetres, that of the meniscus $L_3$, $L_4$ $-62$ millimetres, and that of the collecting element $L_5$, $L_6$ $+40$ millimetres.

The values of the radii of curvature $R_1$ to $R_{10}$ of the various lens surfaces, the centre thicknesses $d_1$ to $d_6$ and the $n_d$ values and $\nu$ values of the lenses $L_1$ to $L_6$ and the lens distances $l$, reckoned from the object axis point, are clear from the following table:

| | | | $n_d$ | $\nu$ |
|---|---|---|---|---|
| $R_1 = -8.52$ | $l_0 = 5.5$ | | | |
| $R_2 = -11.70$ | | $d_1 = 5.6$ | 1.7283 | 28.3 |
| $R_3 = +193.58$ | $l_1 = 0.2$ | | | |
| $R_4 = -13.22$ | | $d_2 = 2.4$ | 1.6080 | 46.2 |
| $R_5 = -7.04$ | $l_2 = 14.0$ | | | |
| $R_6 = -14.10$ | | $d_3 = 2.0$ | 1.6727 | 32.2 |
| $R_7 = -11.62$ | | $d_4 = 4.7$ | 1.6583 | 57.1 |
| $R_8 = +325.90$ | $l_3 = 1.0$ | | | |
| $R_9 = +16.15$ | | $d_5 = 0.8$ | 1.6483 | 33.8 |
| $R_{10} = -16.57$ | | $d_6 = 3.0$ | 1.5163 | 64.0 |

With this lens the Petzval sum is 0.01300, while in the case of a thin crown glass lens of the same focal length it would be 0.04177.

I claim:

1. A microscope lens for lower power magnification, of which the front element adjacent to the object is a meniscus having its concave surface facing the object, and which in addition to collecting elements contains a second meniscus lying between said collecting elements, the centre thickness of each of said two menisci being greater than half the radius of curvature of their dispersing outer surfaces, the concave surface of said second meniscus facing the object and the ratio of its focal length to that of the lens lying between the values 2 and 4.

2. A microscope lens for lower power magnification, of which the front element adjacent to the object is a meniscus having its concave surface facing the object, and which in addition to collecting elements contains a second meniscus consisting of glasses cemented together and lying between said collecting elements, the centre thickness of each of said two menisci being greater than half the radius of curvature of their dispersing outer surfaces, the concave surface of said second meniscus facing the object and the ratio of its focal length to that of the lens lying between the values 2 and 4.

3. A lens as claimed in claim 1, having two collecting elements, for the purpose of correcting the apertural and colour error, one of said elements being disposed behind the front meniscus and the other element being disposed behind said second meniscus, said other element at least consisting of glasses which are cemented together.

References Cited in the file of this patent

UNITED STATES PATENTS

| 1,910,115 | Luboshez | May 15, 1933 |
| 2,206,155 | Boegehold | July 2, 1940 |
| 2,644,362 | Ravizzi et al. | July 7, 1953 |
| 2,713,808 | Klein | July 26, 1955 |

FOREIGN PATENTS

| 947,068 | France | Jan. 3, 1949 |